United States Patent
Patil et al.

(10) Patent No.: US 9,658,959 B2
(45) Date of Patent: May 23, 2017

(54) CACHE RESOURCE MANAGER

(71) Applicant: PernixData, Inc., San Jose, CA (US)

(72) Inventors: Mahesh Patil, Cupertino, CA (US);
Sameer Narkhede, Campbell, CA (US)

(73) Assignee: PernixData, Inc., San Jose, CA (US)

( * ) Notice: Subject to any disclaimer, the term of this patent is extended or adjusted under 35 U.S.C. 154(b) by 4 days.

(21) Appl. No.: 14/628,045

(22) Filed: Feb. 20, 2015

(65) Prior Publication Data
US 2016/0246717 A1    Aug. 25, 2016

(51) Int. Cl.
*G06F 12/00*    (2006.01)
*G06F 13/00*    (2006.01)
(Continued)

(52) U.S. Cl.
CPC ...... *G06F 12/0806* (2013.01); *G06F 12/0246* (2013.01); *G06F 12/0813* (2013.01);
(Continued)

(58) Field of Classification Search
CPC ........ G06F 3/0679; G06F 11/14; G06F 12/00; G06F 12/02; G06F 12/0223; G06F 12/023; G06F 12/0238; G06F 12/0246; G06F 12/0804; G06F 12/0806; G06F 12/0808; G06F 12/0811; G06F 12/0813; G06F 12/0844; G06F 12/0866; G06F 12/12; G06F 2212/28; G06F 2212/283; G06F 2212/284; G06F 2212/31; G06F 2212/311; G06F 2212/312; G06F 2212/314; G06F 2212/50; G06F 2212/502; G06F 2212/507; G06F 2212/60; G06F 2212/601;
(Continued)

(56) References Cited

U.S. PATENT DOCUMENTS 5,463,759 A * 10/1995 Ghosh ................. G06F 12/0891
  711/105
5,524,234 A *  6/1996 Martinez, Jr. ....... G06F 12/0804
  711/141
(Continued)

OTHER PUBLICATIONS

Write-Back and Write-Through policies in FVP; Frank Denneman; Jul. 19, 2013; retrieved from http://frankdenneman.nl/2013/07/19/write-back-and-write-through-policies-in-fvp/ on Jun. 14, 2016 (11 pages).*
(Continued)

*Primary Examiner* — Daniel C Chappell
(74) *Attorney, Agent, or Firm* — Gard & Kaslow LLP

(57) ABSTRACT

A resource manager directs cache operating states of virtual machines based on cache resource latency and by distinguishing between latencies in flash memory and latencies in network communications and by distinguishing between executing read commands and executing different types of write commands. As a result, the resource manager can downgrade the cache operating state of the virtual machines differently based on the type of latency being experienced and the type of command being performed. The resource manager can upgrade and/or reset the cache operating state of the virtual machines, when appropriate, and can give priority to some virtual machines over other virtual machines when operating in a downgraded cache operating state.

14 Claims, 5 Drawing Sheets

FLASH RESOURCE

(51) Int. Cl.
*G06F 13/28* (2006.01)
*G06F 12/0806* (2016.01)
*G06F 12/02* (2006.01)
*G06F 12/0813* (2016.01)

(52) U.S. Cl.
CPC .. *G06F 2212/314* (2013.01); *G06F 2212/621* (2013.01); *G06F 2212/7201* (2013.01)

(58) Field of Classification Search
CPC ....... G06F 2212/6012; G06F 2212/603; G06F 2212/62; G06F 2212/621; G06F 2212/622; G06F 2212/72; G06F 2212/7201; G06F 2212/7202; G06F 2212/7206; G06F 2212/7208; G06F 2212/7209
USPC ........................................................ 711/103
See application file for complete search history.

(56) References Cited

U.S. PATENT DOCUMENTS

| | | | | |
|---|---|---|---|---|
| 5,815,648 | A * | 9/1998 | Giovannetti | G06F 12/0866 711/E12.019 |
| 8,392,655 | B2 * | 3/2013 | Olsen | G06F 1/3221 711/118 |
| 2004/0068622 | A1 * | 4/2004 | Van Doren | G06F 12/084 711/146 |
| 2005/0195635 | A1 * | 9/2005 | Conley | G06F 12/0862 365/149 |
| 2008/0221918 | A1 * | 9/2008 | Petersen | G06Q 50/22 705/2 |
| 2009/0083478 | A1 * | 3/2009 | Kunimatsu | G06F 12/0246 711/103 |
| 2012/0226860 | A1 * | 9/2012 | Saito | G06F 3/0617 711/118 |
| 2015/0127910 | A1 * | 5/2015 | Ghai | G06F 12/0804 711/122 |
| 2015/0286438 | A1 * | 10/2015 | Simionescu | G06F 12/0866 711/103 |
| 2015/0378921 | A1 * | 12/2015 | Karippara | G06F 9/45533 710/308 |

OTHER PUBLICATIONS

PernixData FVP Remote Flash Access; Frank Denneman; Dec. 15, 2013; retrieved from http://frankdenneman.nl/2013/12/10/pernixdata-fvp-remote-cache-access/ on Jun. 14, 2016 (10 pages).*
Understanding the I/O Path of a Storage Acceleration Solution; PernixData, compiled using blog posts written by Frank Denneman; copyright 2014; retrieved from http://www.pernixdata.com/sites/default/files/resources/Understanding_IO_Path_of_Storage_Acceleration_Whitepaper.pdf on Jun. 17, 2016 (5 pages).*
FlashTier: a lightweight, consistent and durable storage cache; Saxena et al; EuroSys '12 Proceedings of the 7th ACM european conference on Computer Systems; Oct. 4-13, 2012; pp. 267-280 (14 pages).*
What is a good buffer cache replacement scheme for mobile flash storage?; Kim et al; Proceedings of the 12th ACM SIGMETRICS/PERFORMANCE joint international conference on Measurement and Modeling of Computer Systems; Jun. 11, 2012; pp. 235-246 (12 pages).*
Strategy to Reduce I/O Access Time of Applications in Virtual Machines; Lee et al; 2013 International Conference on IT Convergence and Security ; Dec. 16-18, 2013 (2 pages).*
Effective flash-based SSD caching for high performance home cloud server; Lee et al; IEEE Transactions on Consumer Electronics, vol. 62, iss 2; pp. 215-221 (7 pages).*
File system and storage array design challenges for flash memory; Ramasamy et al; 2014 International Conference on Green Computing Communication and Electrical Engineering ; Jun. 3-Aug. 2014 (8 pages).*
Architecting Flash-based Solid-State Drive for High-performance I/O Virtualization; Song et al; pp. 61-64 (4 pages).*
Adaptive Data Migration in Multi-tiered Storage Based Cloud Environment; Zhang et al; 2010 IEEE 3rd International Conference on Cloud Computing; May 7-Oct. 2010; pp. 148-155 (8 pages).*

* cited by examiner

CACHE RESOURCE MANAGER

BACKGROUND

Field

This non-provisional U.S. patent application relates generally to caching data in computing systems and more specifically to managing cache resources.

Description of Related Art

In computing systems, a cache is a memory system or subsystem that transparently stores data so that future requests for that data can be served faster. As an example, many modern microprocessors incorporate an instruction cache holding a number of instructions; when the microprocessor executes a program loop where the same set of instructions are executed repeatedly, these instructions are fetched from the instruction cache, rather than from an external memory device at a performance penalty of an order of magnitude or more.

In other environments, such as where a computing system hosts multiple virtual machines under the control of a hypervisor, with each virtual machine running one or more applications, caching of objects stored on a network attached storage system can provide significant performance improvements. In some instances, records are cached and then written to the network attached storage system according to a "write back" algorithm. In the "write back" algorithm, the received record is written to the cache before being written to the network attached storage system. The cache system can then direct the writing of the record to the network attached storage system. In other instances, records are synchronously written to the cache and to the network attached storage system according to a "write through" algorithm.

When read commands are sent from the virtual machine to the network attached storage, it may be more efficient to read the records from the cache rather than from the network attached storage. While various write-through and write-back caching algorithms exist, caching and retrieving data quickly and accurately remains a challenge.

Cache resources, as that term is used herein, are physical machines such as flash memory used to store the cached data as well as various network resources (e.g., routers, switches, load balancers, communications servers, etc.) used to access remotely stored cached data. When any of these cache resources slow or fail, benefit of the cache (i.e., faster reads and/or writes) can be reduced or eliminated. This is because the cache typically waits until after the slowed or failed cache operation has occurred before initiating a regular read or write to the network attached storage. Further, this problem is exacerbated when multiple virtual machines are vying for the cache resources. What is needed therefore is a way to continue providing cache benefits despite incurring cache resource performance issues.

SUMMARY

According to various embodiments, a method comprising: receiving by a cache system a command from a virtual machine; and if the received command is a read command then, issuing the read command from the cache system across a network to a remote flash memory if previously issued read commands from the cache system across the network to the remote flash memory did not incur network latency problems, and returning a remote flash memory read command result from the cache system to the virtual machine, else issuing the read command from the cache system to a local flash memory if previously issued read commands from the cache system to the local flash memory did not incur local flash memory read latency problems, and returning a local flash memory read command result from the cache system to the virtual machine, else issuing the read command from the cache system to a storage system and issue a false write command to the local flash memory if previously issued false write commands from the cache system to the local flash memory did not incur local flash memory write latency problems, and returning a storage system read command result from the cache system to the virtual machine, else if the received command is a true write command then, issuing the true write command from the cache system to the local flash memory if previously issued true write commands from the cache system to the local flash memory did not incur local flash write latency problems, else issuing the true write command from the cache system to the storage system, and returning a true write command result from the cache system to the virtual machine.

According to various further embodiments, a method comprising: receiving by a cache system a command from a virtual machine; and if the cache system is operating in a write back cache mode and the received command is a read command then, issuing the read command from the cache system across a network to a remote flash memory if previously issued read commands from the cache system across the network to the remote flash memory did not incur network latency problems, and returning a remote flash memory read command result from the cache system to the virtual machine, else transitioning the cache system to operating in a write through cache mode if previously issued read commands from the cache system to a local flash memory did incur local flash memory read latency problems, else issuing the read command from the cache system to the local flash memory if previously issued read commands from the cache system to the local flash memory did not incur local flash memory read latency problems, and returning a local flash memory read command result from the cache system to the virtual machine, else issuing the read command from the cache system to a storage system and issue a false write command to the local flash memory if previously issued false write commands from the cache system to the local flash memory did not incur local flash memory write latency problems, and returning a storage system read command result from the cache system to the virtual machine, else if the cache system is operating in a write back cache mode and the received command is a true write command then, transitioning the cache system to operating in a write through cache mode if previously issued write commands from the cache system to the local flash memory did incur local flash memory write latency problems, else issuing the true write command from the cache system to the local flash memory, and returning a true write command result from the cache system to the virtual machine, and transitioning the cache system to operating in a write through cache mode if previously issued write commands from the cache system to the remote flash memory did incur remote flash memory write latency problems, else issuing the true write command from the cache system to the remote flash memory, and returning a true write command result from the cache system to the virtual machine.

DETAILED DESCRIPTION

To manage cache resources, a resource manager is implemented. The resource manager operates to change a cache operating state of virtual machines based on a latency of the cache resource. The resource manager receives latency data about the cache resource and, when appropriate, instructs the cache system to downgrade the cache operating state of the virtual machines. Such action can distinguish between latencies in flash memory and latencies in network communications. Further, such action can distinguish between latencies in executing read commands and latencies in executing various write commands. As a result, the resource manager can downgrade the cache operating state of the virtual machines differently based on the type of latency being experienced and the type of command/operation being performed. Additionally, because such cache resource performance issues may resolve or improve over time, the resource manager can upgrade and/or reset the cache operating state of the virtual machines from the downgraded operating state. Additionally, in a further embodiment, the resource manager can give priority to some virtual machines over other virtual machines when operating in a downgraded cache operating state.

Figure 1:
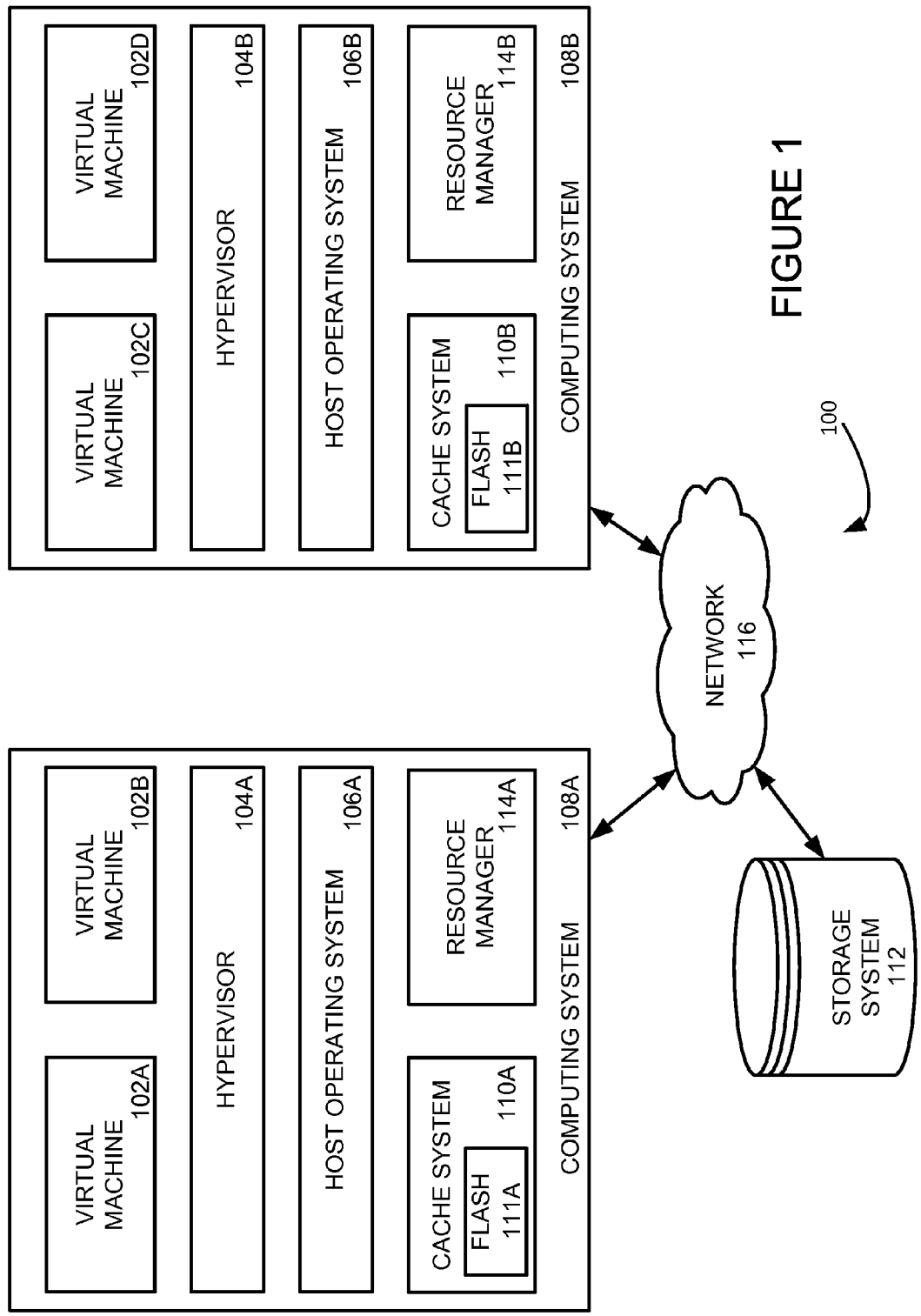
FIG. 1 is a block diagram of a portion of a computing system operating environment in which various embodiments can be practiced.

FIG. 1 is a block diagram of a portion of an environment 100 in which various embodiments can be practiced. Referring first to computing system 108A on the left, the environment 100 comprises one or more virtual machines 102 (denoted 102A & 102B in the figure, and wherein each virtual machine can itself be considered an application) executed by a hypervisor 104A. The hypervisor 104A is executed by a host operating system 106A (which may itself include the hypervisor 104A). The host operating system 106A resides on the physical computing system 108A having a cache system 110A. The cache system 110A includes operating logic to cache data within a local memory (as well as a remote memory, as will be explained). The local memory is a faster, more expensive memory such as flash memory 111A. The environment 100 can include multiple computing systems 108, as is indicated in the figure by computing system 108A and computing system 108B. Each of computing system 108A and 108B are configured to communicate across a network 116 with a storage system 112 to store data. Network 116 is any known communications network including a local area network, a wide area network, a proprietary network or the Internet. The storage system 112 is a slower memory, such as a hard disk. The environment 100 can include multiple storage systems 112. Examples of storage system 112 include, but are not limited to, a storage area network (SAN), a local disk, a shared serial attached "small computer system interface (SCSI)" (SAS) box, a network file system (NFS), a network attached storage (NAS), and an object store.

Referring to either of computing system 108A or 108B, when a virtual machine 102 generates a read command or a write command, the application sends the generated command to the host operating system 106. The virtual machine 102 includes, in the generated command, an instruction to read or write a data record at a specified location in the storage system 112. The cache system 110 receives the sent command and caches the data record and the specified storage system memory location. As understood by one of skill in the art, in a write-through cache system, the generated write commands are simultaneously sent to the storage system 112. Conversely, in a write-back cache system, the generated write commands are subsequently sent to the storage system 112 typically using what is referred to herein as a destager.

In some embodiments of the present approach, and as would be understood by one of skill in the art in light of the teachings herein, the environment 100 of FIG. 1 can be further simplified to being a computing system running an operating system running one or more applications that communicate directly or indirectly with the storage system 112.

As stated above, cache system 110 includes various cache resources. In particular and as shown in the figure, cache system 110 includes a flash memory resource 111 (e.g., 111A and 111B in the figure) for storing cached data records. Further, cache system 110 also includes network resources for communicating across network 116.

Such cache resources are used by cache system 110 to facilitate normal cache operations. For example, virtual machine 102A may generate a read command for a data record stored in storage system 112. As has been explained and as understood by one of skill in the art, the data record is received by cache system 110A. Cache system 110A may determine that the data record to be read is not in flash memory 111A (known as a "cache miss") and therefore issue a read command across network 116 to storage system 112. Storage system 112 reads the requested data record and returns it as a response communicated back across network 116 to cache system 110A. Cache system 110A then returns the read data record to virtual machine 102A and also writes or stores it in flash memory 111A (in what is referred to herein as a "false write" because it is a write to cache memory initiated by a generated read command versus a write to cache memory initiated by a generated write command which is sometimes referred to herein as a "true write" to differentiate it from a false write).

Having now stored the data record in flash memory 111A, cache system 110A can, following typical cache operations, now provide that data record in a more expeditious manner for a subsequent read of that data record. For example, should virtual machine 102A, or virtual machine 102B for that matter, generate another read command for that same data record, cache system 110A can merely read that data record from flash memory 111A and return it to the requesting virtual machine rather than having to take the time to issue a read across network 116 to storage system 112, which is known to typically take longer than simply reading from local flash memory.

Likewise, as would be understood by one of skill in the art in light of the teachings herein, virtual machine 102A can generate a write command for a data record stored in storage system 112 which write command can result in cache system 110A writing or storing the data record in flash memory 111A and in storage system 112 using either a write-through or write-back cache approach.

Still further, in addition to reading from and/or writing to flash memory 111A, in some embodiments cache system 110A can also read from and/or write to flash memory 111B and, likewise, cache system 110B can read from and/or write to flash memory 111B as well as flash memory 111A in what is referred to herein as a distributed cache memory system. Of course, such operations require communicating across network 116 because these components are part of physically separate computing systems, namely computing system 108A and 108B.

While these various cache operations are intended to improve operating performance of the respective computing systems by more quickly handling read and write commands generated by the virtual machines, that presumes the various cache resources continue to perform within their expected or normal operating parameters. However, such is not always the case, which can result in the cache system causing additional delays rather than providing the expected performance improvement.

For example, should flash memory 111A slow down or fail for whatever reason (e.g., perhaps the flash memory is receiving too many read requests at a given point in time, or is simply experiencing a hardware problem or failure of some kind), because cache system 110A waits for a response from flash memory 111A before timing out and issuing a read to storage system 112, this causes a delay in ultimately reading the requested data record. This delay thus results in slower read performance than if no cache system was involved.

Similarly, should network 116 slow down or fail for whatever reason (e.g., perhaps there is too much other traffic on the network or some network component is experiencing a hardware problem or failure of some kind), because cache system 110A waits for a response from flash 111B before timing out and issuing a read to flash 111A, this likewise causes a delay in ultimately reading the requested data record. This delay thus also results in slower read performance than if no distributed cache memory system was involved.

These problems can become exacerbated if there are slow downs or failures of both types of cache resources, e.g., both flash memory 111A and network 116, because then cache system 110A may sequentially wait for a response from each or timing out in each case before issuing a read to storage system 112.

In each of these examples, the resulting delay means slower read and/or write performance than if no cache system was in place, which is clearly not a desirable outcome and one that may lead to simply stopping any further cache operations from being performed.

What is described and shown herein is an approach to dealing with these various forms of cache resource slow down and failure conditions and situations that results in continued use of the cache system in a tiered or downgraded set of cache operating states, with subsequent upgrades or reset to normal operational states as appropriate, as will now be explained.

Referring again to FIG. 1, a resource manager 114 of the computing system 108 manages cache system 110's usage of the caching resources. The resource manager 114 can be implemented as a complementary module to the cache system 110 (as depicted in the figure) or can be incorporated into the cache system 110. In a further embodiment, both the resource manager 114 and the cache system 110 are incorporated into the host operating system 106.

The resource manager 114, as well as the cache system 110, can be implemented in a variety of ways known to those skilled in the art including, but not limited to, as a computing device having a processor with access to a memory capable of storing executable instructions for performing the functions of the described modules. The computing device can include one or more input and output components, including components for communicating with other computing devices via a network (e.g., the Internet) or other form of communication. The resource manager 114 and/or the cache system 110 comprise one or more modules embodied in computing logic or executable code such as software.

In one embodiment, the resource manager 114 is configured to receive input records from the cache system 110 regarding the cache resources. As has been explained, the cache resources can include flash resources and network resources. The input records include information about the performance of the cache resource. In various embodiments, the input record includes a virtual machine (e.g., virtual machine 102) identifier, a client type (i.e., type of resource user, e.g., virtual machine, destager, or remote virtual machine), a cache resource identifier, a field indicating an input/output (TO) type (e.g., read command or write command), a latency indication, a cumulative number of IO operations (IOPs), a number of bytes transferred, a priority field, and a cache resource current state indicator (e.g., normal or degraded). Some of the fields in the input record can be assigned to default values when the input record is denoting cumulative statistics of all virtual machines consuming the cache resource.

The resource manager 114 is configured to determine, from the latency indicated by the input records, if the cache resource is performing poorly. The latency can be the latency included in the latency field of a single input record or of a plurality of received input records. In other embodiments, the resource manager 114 can calculate the latency based on two or more of the values included in the fields of the input records.

The resource manager 114 compares the latency indicated by the input record(s) to a latency threshold in order to determine how the cache system 110 should continue supporting the virtual machine(s). The latency threshold is a pre-defined latency value below which the cache resource is expected to be operating. The latency threshold can be a default value, specific to a current state of the cache resource, or can be dynamically calculated (e.g., since cache latency should remain less than SAN latency to ensure benefit of the cache system, the latency threshold could be dynamically adjusted to be less than that of the currently measured SAN latency). When a virtual machine is operating in a downgraded state for a given cache resource, a different pre-defined latency threshold can be compared to the latency of the cache resource. Examples of such latency thresholds are explained further elsewhere herein.

The resource manager 114, based on the above determination, instructs the cache system 108 to change the cache operating state of the virtual machine(s) by issuing an upgrade or downgrade instruction to the cache system 108. The instruction can be in the form of an output record that includes fields such as a virtual machine identifier, a client type, a resource identifier, an TO type, and an instruction to perform an action (e.g., downgrade or upgrade).

The instructed change in cache operating state of the virtual machine(s) is noted by setting one or more internal policy flags stored in or available to the resource manager 114 and/or cache system 110. The transitions between operating cache states, and the determinations made to transition between them, is illustrated below as state diagrams with accompanying description. As shown and described, the cache operating state can be downgraded from a normal operating state or from an already downgraded state. If the resource is in a downgraded state, the resource can be upgraded to a higher level operating state including all the way to a normal operating state.

The resource manager is also configured to reset usage of the cache resource to a normal operating state in the event of a reset event. As explained below, a reset event can occur based on an elapsed period of time, a latency of the cache resource, a state of the cache resource, or the like.

Figure 2:
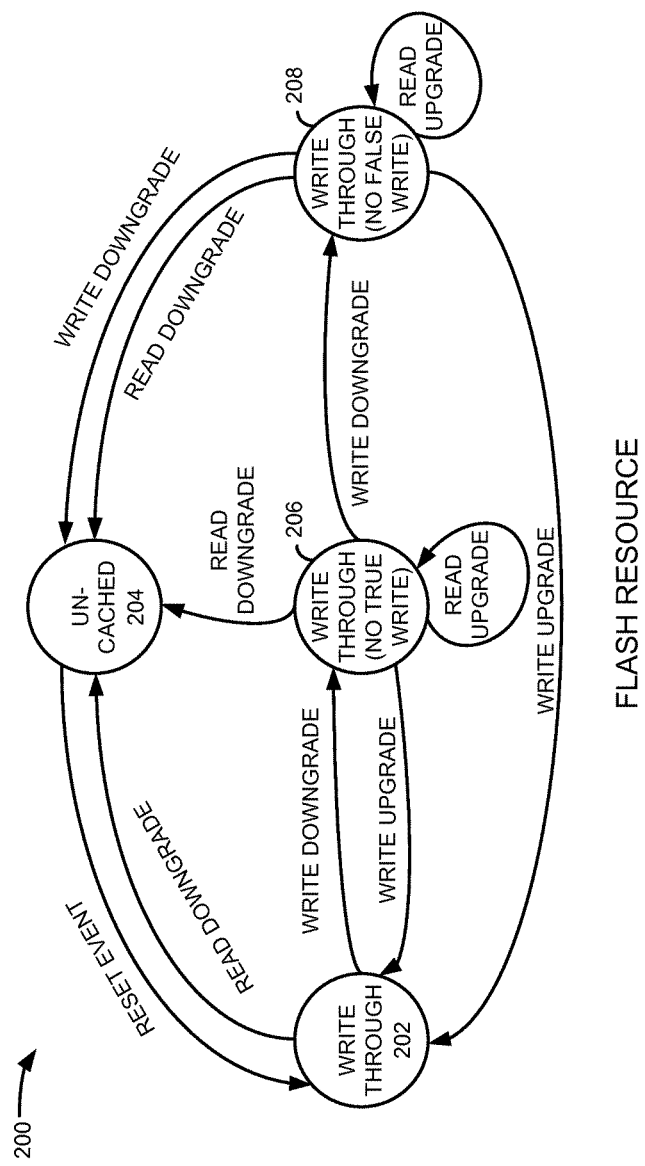
FIG. 2 is a state diagram, according to a write through algorithm, of cache operating states as instructed by a resource manager when flash resource latency is experienced, according to some embodiments.
Figure 3:
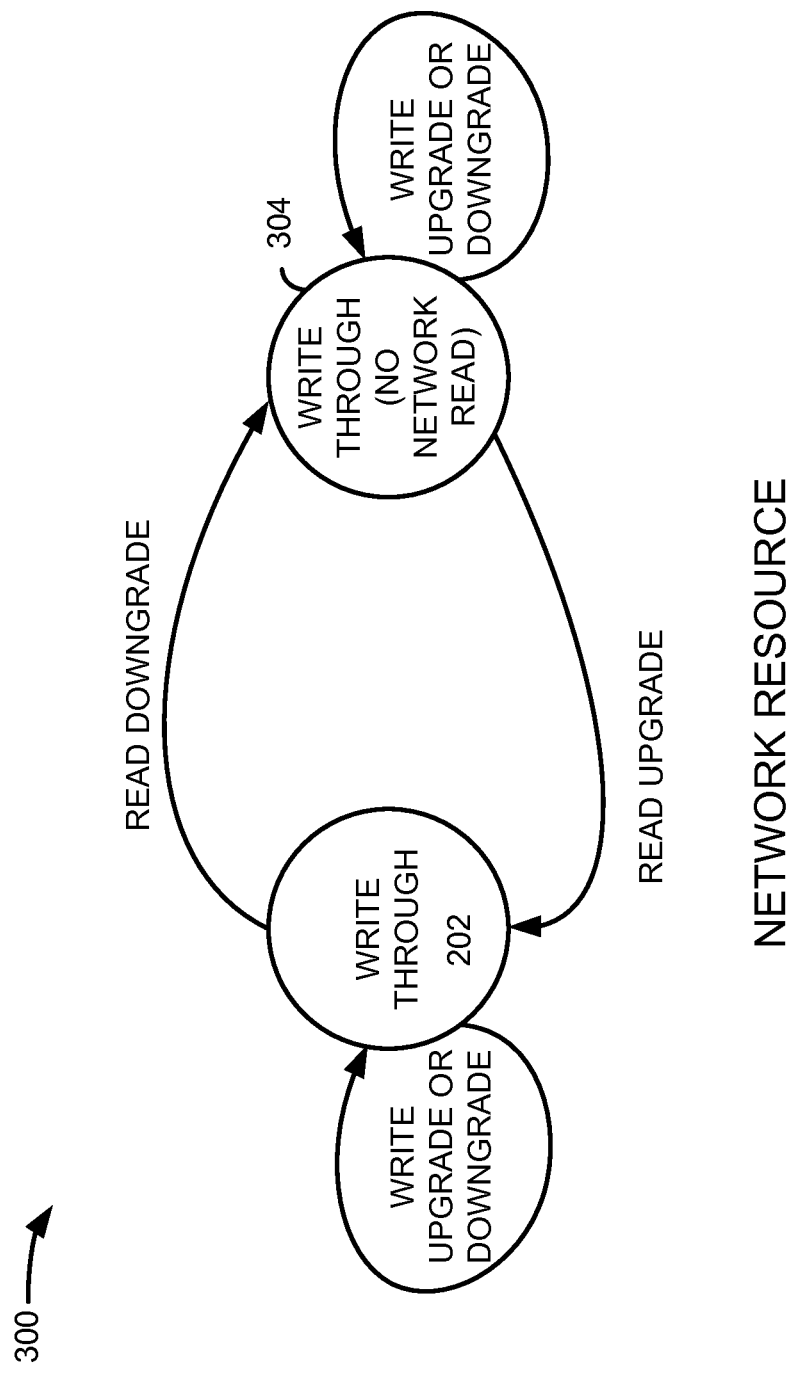
FIG. 3 is a state diagram, according to the write through algorithm, of cache operating states as instructed by the resource manager when network resource latency is experienced, according to some embodiments.

Referring now to FIGS. 2 and 3, various cache operating states of virtual machines running on a computing system supported by a cache system operating in a write-through mode as directed by a resource manager will now be described.

In one embodiment, referring first to FIG. 2, a beginning cache operating state, when cache resources are operating within their expected or normal operating parameters, is that of a write through cache operating state 202. In this cache operating state, write operations for each virtual machine are treated by the cache system in a typical write through cache operating mode.

However, should there be performance issues in performing writes to the cache memory, a write downgrade occurs via a transition to a write-through with no true writes cache operating state 206 for one or more virtual machine. This transition to no longer allowing true writes reduces traffic to the cache memory thereby potentially giving the cache memory a chance to resolve its performance issues.

Likewise, should there be additional performance issues in performing writes to the cache memory, a further write downgrade occurs via a transition to a write-through with no false writes cache operating state 208 for one or more virtual machine. This transition to no longer allowing false writes further reduces traffic to the cache memory thereby potentially giving it an even better chance to resolve its performance issues.

Of note regarding the above two write downgrade state transitions (that is, from write through cache operating state 202 to write through with no true writes cache operating state 206, as well as from write through with no true writes cache operating state 206 to write through with no false writes cache operating state 208) is that they do not affect any read operations from the virtual machines. In other words, despite these write downgrade transitions affecting whether certain kinds of writes to cache memory will be performed by the cache system, they have no affect on read operations being performed by the cache system which can continue to occur despite the experienced performance issues.

If, however, there are performance issues in performing reads from the cache memory, a read downgrade occurs via a transition to an uncached cache operating state 204 for one or more virtual machine. Such a read downgrade transition can be made from any of cache operating states 202, 206 and 208. This transition to an uncached state where cache operations are no longer being performed potentially gives the cache system, and in particular the cache resources, an opportunity to resolve their performance issues.

Likewise, referring now to FIG. 3, should there be performance issues in network communications as part of cache operations occurring across the network, a read downgrade occurs via a read downgrade transition from the write through cache operating state 202 to a write through with no network reads cache operating state 304 for one or more virtual machine. This transition to no longer allowing network reads reduces traffic across the network thereby potentially giving the network a chance to resolve its performance issues.

Of note regarding the read downgrade transition from write through cache operating state 202 to write through with no network reads operating state 304 is that it does not affect any write operations from the virtual machines. In other words, despite this read downgrade transition affecting whether certain kinds of reads will be performed by the cache system, it has no affect on write operations being performed by the cache system which can continue to occur despite the experienced network performance issues.

To further explain these various operations and state transitions, the following outlines an approach or process of an example embodiment of a resource manager working with or directing a cache system operating in a write through operating mode:

1. Each virtual machine is assigned one or more policy flag by the resource manager to be used by the resource manager and the cache system in determining what cache operations will be performed on behalf of the virtual machines as described herein. In one embodiment, when the cache system is operating in a write through cache operating mode, each assigned policy flag begins with an indicator of write through (i.e., "WT").

2. A function call is made to "reset the policy flags if required." This function call, and how it determines whether a reset should be performed, is explained further elsewhere herein.

3. If a virtual machine issues a read command, the process continues with step 5.

4. If a virtual machine issues a write command, the process continues with step 11.

5. If the virtual machine that issued the read command has a policy flag of WT_No_Remote_Read, the process continues with step 7, else the process continues with step 6.

6. A read is issued to remote flash memory located across the network on another computing system in a distributed cache memory system.
   a. Subsequently, the read over the network finishes.
      i. If the resulting read latency is greater than a variable remoteReadThreshold, then a variable slowRemoteReadCount is incremented.
      ii. The resulting read latency is then added to a global variable globalRollingRemoteReadLatency.
      iii. If the variable slowRemoteReadCount is greater than a variable slowRemoteReadThreshold then the policy flag WT_NO_Remote_Read is added to the policy flags of the virtual machines and a variable timeStampSlowRemoteReadCount is set to the current time.
   b. If all data has been retrieved from remote flash then the read is done and the process continues with Step 10, else the process continues with step 7.

7. If the virtual machine that issued the read command has a policy flag WT_NO_Local_Read then the process continues with step 9, else the process continues with step 8.

8. A read is issued to local flash memory.
   a. Subsequently, the local flash memory read finishes.
      i. If the resulting read latency is greater than a variable localReadThreshold, then a variable slowLocalReadCount is incremented.
      ii. The resulting read latency is added to a global variable globalRollingLocalReadLatency.
      iii. If a variable slowLocalReadCount is greater than a variable slowLocalReadThreshold then the policy flag WT_NO_Local_Read is added to the policy flags of the virtual machines and a variable timeStampSlowLocalReadCount is set to the current time.
b. If all data has been retrieved from local flash then the read is done and the process continues with step 10, else the process continues with step 9.
9. A read is issued to the storage system (e.g., a SAN).
 a. Subsequently, the storage system read finishes.
  i. If the virtual machine(s) has a policy flag of WT_NO_False_Write, then the process continues with step 10, else the process continues with step 9(a)(ii).
  ii. A false write is issued to the local flash.
  iii. Subsequently, the false write to the local flash finishes.
  iv. If the resulting write latency is greater than a variable localFalseWriteThreshold, then a variable slowLocalFalseWriteCount is incremented.
  v. The resulting write latency is added to a global variable globalRollingFalseWriteLatency.
  vi. If the variable slowLocalFalseWriteCount is greater than a variable slowLocalFalseWriteThreshold, then the policy flag WT_NO_False_Write is added to the policy flags of the virtual machines.
10. The process continues by returning to step 2.
11. If the virtual machine(s) has the policy flag WT_No_True_Write, then the process continues with step 13, else the process continues with step 12.
12. A write is issued to the local flash.
 a. Subsequently, the local flash write finishes.
  i. If the resulting write latency is greater than a variable local WriteThreshold, then a variable slowLocalWriteCount is incremented.
  ii. The resulting write latency is added to a global variable globalRollingTrueWriteLatency.
  iii. If a variable slowLocalWriteCount is greater than a variable slowLocalWriteThreshold, then the policy flag WT_NO_True_Write is added to the policy flags of the virtual machines and a variable timeStampSlowWrite is set to the current time.
13. A write is issued to the storage system (e.g., a SAN).
14. The process continues by returning to step 2.

As has now been explained, when operating in the write through cache operating mode, virtual machines can have various policy flags as shown in the following Write Through Virtual Machine (WT VM) table:

| Operation for WT VM | Local Flash | Remote Flash |
|---|---|---|
| Read | WT_No_Local_Read | WT_No_Remote_Read |
| True Write | WT_No_True_Write | Not Applicable |
| False Write | WT_No_False_Write | Not Applicable |

The above exemplary embodiment functions in a write through cache operating mode to recognize and address cache resource performance issues in order for the cache system to operate more efficiently and best service read and/or write commands from the virtual machines.

For example, in step 6, the resource manager determines whether a network read latency is large enough to be considered significant (e.g., exceeds a threshold) and, if so, then adds it to a running count of how many times that has occurred. Then, when that running count grows large enough to indicate a performance issue (e.g., exceeds a threshold), the resource manager directs that no further network reads are to be performed by setting policy flags of the virtual machines accordingly (which policy flag is then checked in step 5 on a subsequently received read command).

Likewise, in step 8, the resource manager determines whether a local read latency is large enough to be considered significant (e.g., exceeds a threshold) and, if so, then adds it to a running count of how many times that has occurred. Then, when that running count grows large enough to indicate a performance issue (e.g., exceeds another threshold), the resource manager directs that no further local reads are to be performed by setting policy flags of the virtual machines accordingly (which policy flag is then checked in step 7 on a subsequently received read command).

Similarly, in step 9, the resource manager determines whether a false write latency to local flash is large enough to be considered significant (e.g., exceeds a threshold) and, if so, then adds it to a running count of how many times that has occurred. Then, when that running count grows large enough to indicate a performance issue (e.g., exceeds another threshold), the resource manager directs that no further false writes are to be performed by setting policy flags of the virtual machines accordingly (which policy flag is then checked in step 9(a)(i) on a subsequent attempt of a false write operation).

Likewise, in step 12, the resource manager determines whether a local true write latency is large enough to be considered significant (e.g., exceeds a threshold) and, if so, then adds it to a running count of how many times that has occurred. Then, when that running count grows large enough to indicate a performance issue (e.g., exceeds another threshold), the resource manager directs that no further local true writes are to be performed by setting policy flags of the virtual machines accordingly (which policy flag is then checked in step 11 on a subsequently received true write command).

Figure 4:
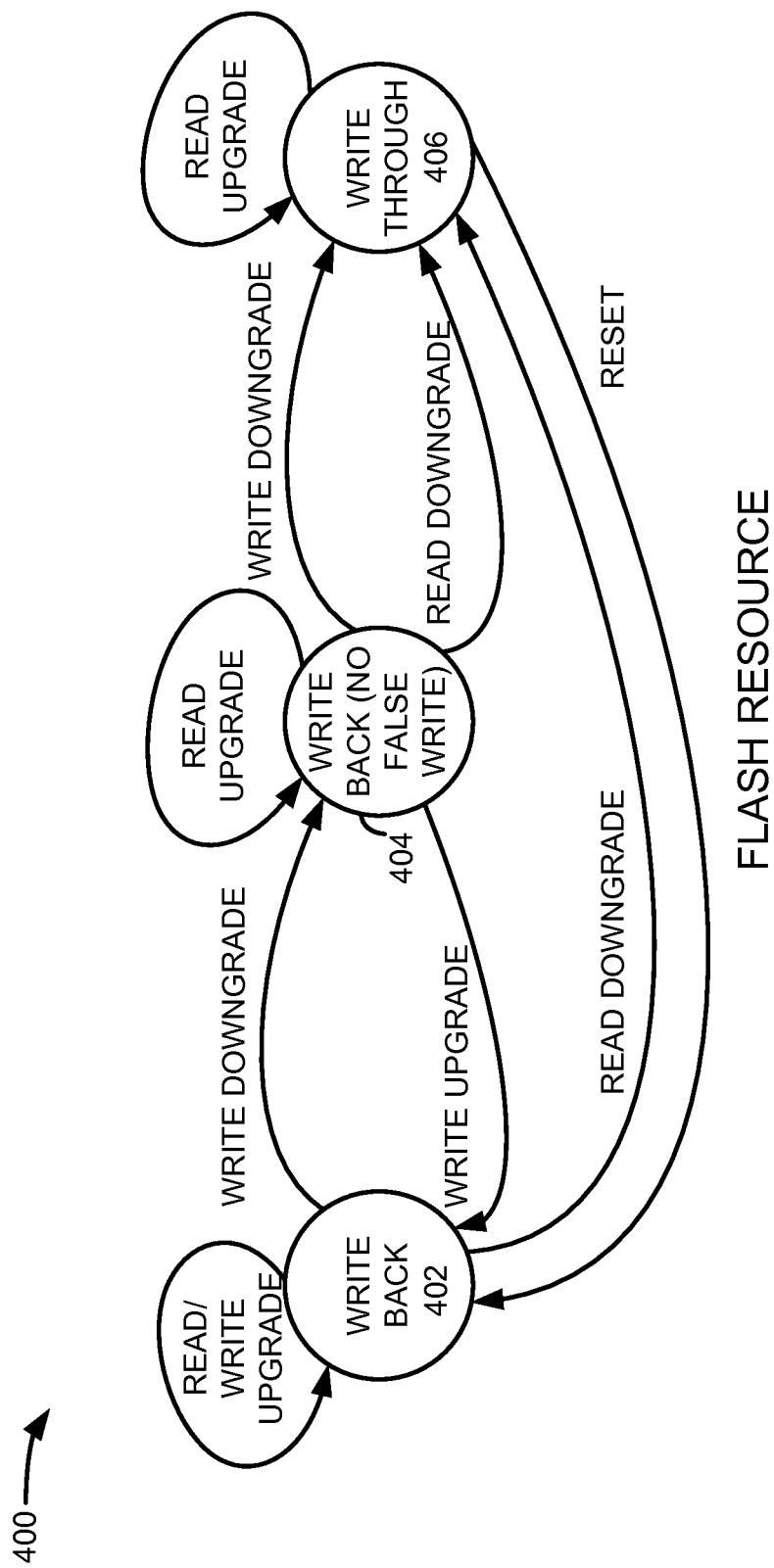
FIG. 4 is a state diagram, according to a write back algorithm, of cache operating states as instructed by a resource manager when flash resource latency is experienced, according to some embodiments.
Figure 5:
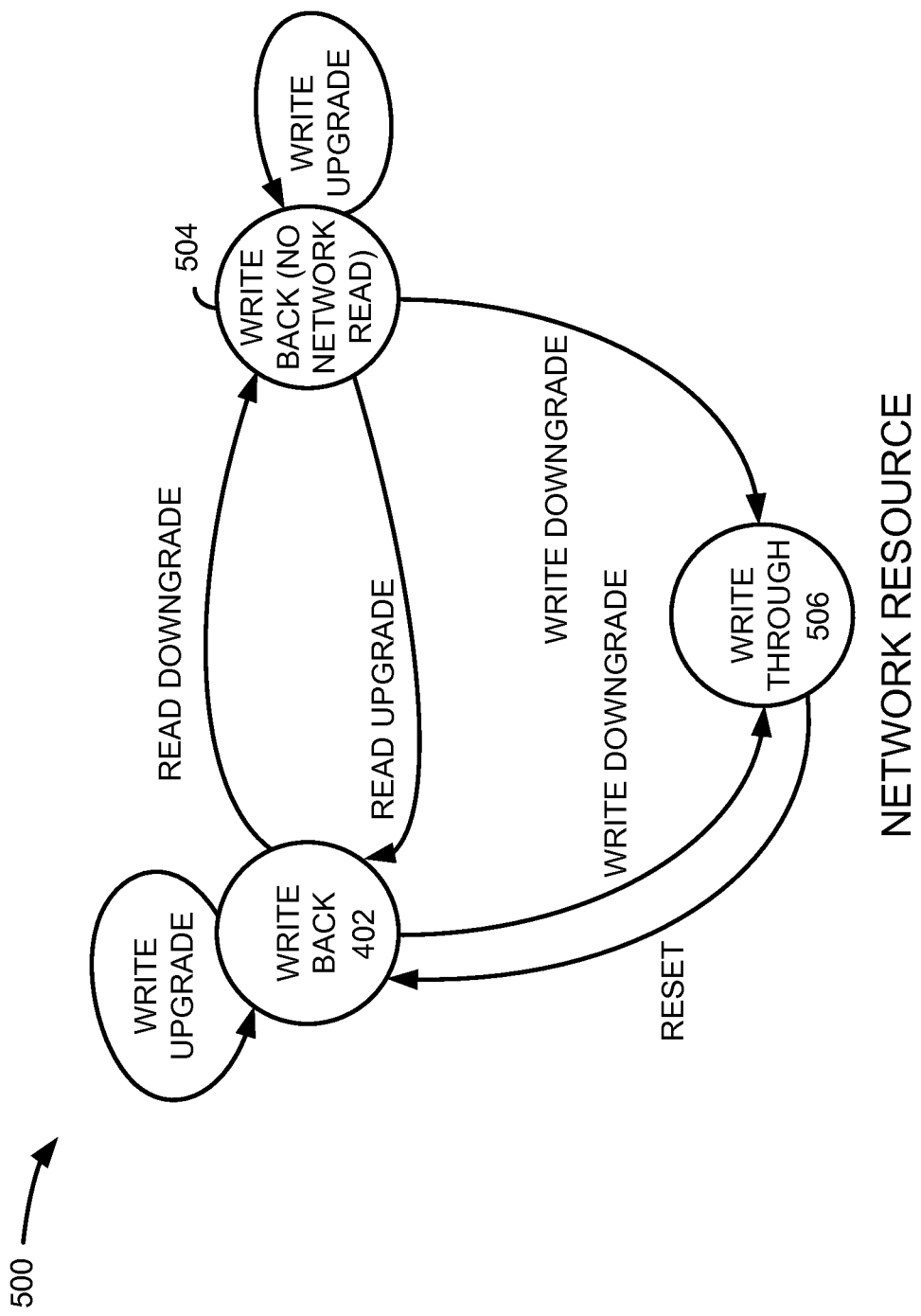
FIG. 5 is a state diagram, according to the write back algorithm, of cache operating states as instructed by the resource manager when network resource latency is experienced, according to some embodiments.

The above process addressed a resource manager directing a cache system operating in a write through mode. Referring now to FIGS. 4 and 5, various cache operating states of virtual machines running on a computing system supported by a cache system operating in a write back mode as directed by a resource manager will now be described.

In one embodiment, referring first to FIG. 4, a beginning cache operating state, when cache resources are operating within their expected or normal operating parameters, is that of a write back cache operating state 402. In this cache operating state, write operations for each virtual machine are treated by the cache system in a typical write back cache operating mode.

However, should there be performance issues in performing writes to the cache memory, a write downgrade occurs via a transition to a write-back with no false writes cache operating state 404 for one or more virtual machine. This transition to no longer allowing false writes reduces traffic to the cache memory thereby potentially giving the cache memory a chance to resolve its performance issues.

Likewise, should there be additional performance issues in performing writes to the cache memory, a further write downgrade occurs via a transition to a write-through cache operating state 406 for one or more virtual machine. Write through cache operating state 406 is the same as the beginning operating state 202 of FIGS. 2 and 3. In other words, this write downgrade causes the cache system to revert to performing in the cache through mode rather than in the cache back mode for that one or more virtual machine.

Of note regarding the above two write downgrade state transitions (that is, from write back cache operating state 402 to write back with no false writes cache operating state 404, as well as from write back with no false writes cache operating state 404 to write through operating state 406) is that they do not affect any read operations from the virtual machines. In other words, despite these write downgrade transitions affecting whether certain kinds of writes to cache memory will be performed by the cache system or whether the cache system is operating in a write back or write through cache mode, they have no affect on read operations being performed by the cache system which can continue to occur despite the experienced performance issues.

If, however, there are performance issues in performing reads from the cache memory in either the write back cache operating state 402 or the write back with no false writes cache operating state 404, a read downgrade occurs via a transition to the write through cache operating state 406 for one or more virtual machine, rather than directly transitioning to an uncached state.

Likewise, referring now to FIG. 5, should there be performance issues in network communications as part of cache read operations occurring across the network, a read downgrade occurs via a read downgrade transition from the write back cache operating state 402 to a write back with no network reads cache operating state 504 for one or more virtual machine. This transition to no longer allowing network reads reduces traffic across the network thereby potentially giving the network a chance to resolve its performance issues.

Similarly, should there be performance issues in network communications as part of cache write operations occurring across the network, a write downgrade occurs via a write downgrade transition from the write back cache operating state 402 to write through cache operating state 506 where the cache system has reverted to performing in the write through mode rather than in the write back mode.

To further explain these various operations and state transitions, the following outlines an approach or process of an example embodiment of a resource manager working with or directing a cache system operating in a write back operating mode:

1. Each virtual machine is assigned one or more policy flag by the resource manager to be used by the resource manager and the cache system in determining what cache operations will be performed on behalf of the virtual machines, as described herein. In one embodiment, when the cache system is operating in a write back cache operating mode, each assigned policy flag begins with an indicator of write back (i.e., "WB").

2. A function call is made to "reset the policy flags if required." This function call, and how it determines whether a reset should be performed, is explained further elsewhere herein.

3. If a virtual machine issues a read command, the process continues with step 5.

4. If a virtual machine issues a write command, the process continues with step 11.

5. If the policy flag of the virtual machine that issued the read command contains WB_No_Remote_Read, the process continues with step 7, else the process continues with step 6.

6. A read is issued to remote flash memory located across the network on another computing system in a distributed cache memory system.
   a. Subsequently, the read over the network finishes.
      i. If the resulting read latency is greater than a variable remoteReadThreshold, then a variable slowRemoteReadCount is incremented.
      ii. The resulting read latency is added to a global variable globalRollingRemoteReadLatency.
      iii. If the variable slowRemoteReadCount is greater than a variable slowRemoteReadThreshold then the policy flag WB_NO_Remote_Read is added to the policy flags of the virtual machines and a variable timeStampSlowRemoteReadCount is set to the current time.
   b. If all data has been retrieved from remote flash then the read is done and the process continues with Step 10, else the process continues with step 7.

7. If the virtual machine that issued the read command has the policy flag WB_NO_Local_Read then the process transitions to operating in the above-described write through cache operating mode by, in one embodiment, an instruction from the resource manager to the cache system and setting the appropriate policy flags of the virtual machines, else the process continues to step 8.

8. A read is issued to local flash memory.
   a. Subsequently, the local flash memory read finishes.
      i. If the resulting read latency is greater than a variable localReadThreshold, then a variable slowLocalReadCount is incremented.
      ii. The resulting read latency is added to a global variable globalRollingLocalReadLatency.
      iii. If a variable slowLocalReadCount is greater than a variable slowLocalReadThreshold then the policy flag WB_NO_Local_Read is added to the policy flags of the virtual machines and a variable timeStampSlowLocalReadCount is set to the current time.
   b. If all data has been retrieved from local flash then the read is done and the process continues with step 10, else the process continues with step 9.

9. A read is issued to the storage system (e.g., a SAN).
   a. Subsequently, the storage system read finishes.
      i. If the virtual machine(s) has a policy flag of WB_NO_False_Write, then the process continues with step 10, else the process continues with step 9(a)(ii).
      ii. A false write is issued to the local flash.
      iii. Subsequently, the false write to the local flash finishes.
      iv. If the resulting write latency is greater than a variable localFalseWriteThreshold, a variable slowLocalFalseWriteCount is incremented.
      v. The resulting write latency is added to a global variable globalRollingFalseWriteLatency.
      vi. If the variable slowLocalFalseWriteCount is greater than a variable slowLocalFalseWriteThreshold, then the policy flag WB_NO_False_Write is added to the policy flags of the virtual machines.

10. The process continues by returning to step 2.

11. If the virtual machine(s) has a policy flag of WB_No_Local_Write, then the process transitions to write through mode, else the process continues to step 12.

12. A write is issued to the local flash.
   a. Subsequently, the local flash write finishes.
      i. If the resulting write latency is greater than a variable local WriteThreshold, then a variable slowLocalWriteCount is incremented.
      ii. The resulting write latency is added to a global variable globalRollingTrueWriteLatency.
      iii. If a variable slowLocalWriteCount is greater than a variable slowLocalWriteThreshold, then the policy flag WB_NO_Local_Write is added to the policy flags of the virtual machines and a variable timeStampSlowWrite is set to the current time.

13. If the virtual machine(s) has a policy flag of WB_No_Remote_Write, then the process transitions to operating in the above-described write through cache operating mode by, in one embodiment, an instruction from the resource manager to the cache system and setting the appropriate policy flags of the virtual machines, else the process continues to step 14.

14. A write is issued to the remote flash.
  a. Subsequently, the remote flash write finishes.
    i. If the resulting write latency is greater than a variable remoteWriteThreshold, then a variable slowRemoteWriteCount is incremented.
    ii. The resulting write latency is added to a global variable globalRollingWriteLatency.
    iii. If a variable slowRemoteWriteCount is greater than a variable slowRemoteWriteThreshold, then the policy flag WB_NO_Remote_Write is added to the policy flags of the virtual machines and a variable timeStampSlowWrite is set to the current time.

14. The process continues by returning to step 2.

As has now been explained, when operating in the write back cache operating mode, virtual machines can have various policy flags as shown in the following Write Back Virtual Machine (WB VM) table:

| Operation for WB VM | Local Flash | Remote Flash |
| --- | --- | --- |
| Read | WB_No_Local_Read | WB_No_Remote_Read |
| True Write | WB_No_True_Write | WB_No_Remote_Write |
| False Write | WB_No_False_Write | Not Applicable |

Similarly to the exemplary embodiment for functioning in a write through cache operating mode, the above exemplary embodiment functions in a write back cache operating mode to recognize and address cache resource performance issues in order for the cache system to operate more efficiently and best service read and/or write commands from the virtual machines.

This is performed in essentially the same way as was described above regarding the write back cache operating mode, at least with respect to steps 6, 8, 9 and 12. Additionally, when operating in the write back cache operating mode, in step 14, the resource manager determines whether a network write to remote flash latency is large enough to be considered significant (e.g., exceeds a threshold) and, if so, then adds it to a running count of how many times that has occurred. Then, when that running count grows large enough to indicate a performance issue (e.g., exceeds another threshold), the resource manager directs that no further network writes to remote flash are to be performed by setting policy flags of the virtual machines accordingly (which policy flag is then checked in step 13 on a subsequently attempt to perform a write to remote flash).

Additionally, when operating in write back cache operating mode, the outcome in various places is to transition from the write back cache operating mode to the write through cache operating mode. This outcome is evident in steps 5, 7, 11, 13, depending upon the status of the policy flags of the virtual machines.

Of further note is that, as described, the above processes and operations have primarily dealt with degradations of cache resource performance. Of course, performance of these cache resources can likewise improve in which case it may be desirable to upgrade or reset cache operating states rather than continue in the various downgraded cache operating states (as was indicated in FIG. 2 by the "reset event" transition from uncached 204 to write through cache operating mode 202; it is to be understood that such upgrades or reset events can occur from any of a number of the various cache operating states to any of a number of the other cache operating states as shown in the figures and described herein). Facilitating such upgrades or resets of cache operating states can be performed in various ways as will now be described.

In a first approach, such an upgrade or reset is based on elapsed time since policy flags of the virtual machines have been set, as follows:

1. If current_time_stamp minus timeStampSlowRemoteReadCount is greater than remoteReadResetThresholdTS, then remove the policy flag WT_NO_Remote_Read from the policy flags of the virtual machines.

2. If current_time_stamp minus timeStampSlowLocalReadCount is greater than localReadResetThresholdTS, then remove the policy flag WT_NO_Local_Read from the policy flags of the virtual machines.

3. If current_time_stamp minus timeStampSlowFalseWrite is greater than falseWriteResetThresholdTS, then remove the policy flag WT_NO_False_Write from the policy flags of the virtual machines.

4. If current_time_stamp minus timeStampSlowTrueWrite is greater than trueWriteResetThresholdTS, then remove the policy flag WT_NO_True_Write from the policy flags of the virtual machines.

In a second approach, such an upgrade or reset is based on global rolling latency determinations, as follows:

1. If globalRollingRemoteReadLatency is less than remoteReadLatencyThreshold, then remove the policy flag WT_NO_Remote_Read from the policy flags of the virtual machines.

2. If globalRollingLocalReadLatency is less than localReadLatencyThreshold, then remove the policy flag WT_NO_Local_Read from the policy flags of the virtual machines.

3. If globalRollingFalseWriteLatency is less than falseWriteLatencyThreshold, then remove the policy flag WT_NO_False_Write from the policy flags of the virtual machines.

4. If globalRollingTrueWriteLatency is less than TrueWriteLatencyThreshold, then remove the policy flag WT_NO_True_Write from the policy flags of the virtual machines.

With respect to determining the above global latencies globalRollingReadLatency and globalRollingWritelatency:

1. For each of the cache resources (e.g., flash memory, network and SAN (i.e., storage device) resource), the resource manager periodically collects the records containing (vmID, resource, ioType, latency, TOPS, bytes) information into a data structure referred to herein as recordlist.

2. Then, for each virtual machine, the resource manager parses the associated SAN resource records and deduces the normalized maxReadLatency and maxWriteLatency seen by that virtual machine.

3. Then, for each network or flash memory resource, the resource manager parses the associated virtual machines and stores the maximum maxReadLatency as globalRollingReadLatency and the maximum maxWriteLatency as the globalRollingWriteLatency.

Using these techniques, as would be understood by one of skill in the art in light of the teachings herein, upgrade and reset transitions can be performed when cache resource performance has returned to operating within normal parameters or after enough time has elapsed to warrant returning to such operational state.

One or more approaches to reducing cache resource usage if the latency encountered with or derived from that usage is over a certain threshold has now been explained. Such approaches reduced the usage of the cache resource(s) for some types of IOs so that other types of IOs would benefit (e.g., true writes and reads benefit by disabling false writes). What will now be described is a further embodiment in which such approaches can be used to implement virtual machine prioritization. By prioritizing the virtual machines, the resource manager and cache system will give priority to IOs from higher priority virtual machines. In other words, in a further embodiment, when encountering cache resource performance issues, priority is given to some virtual machines over other virtual machines, as will now be explained.

Of note here is that while the above-described approaches dealt with performance degradation of cache resources, this further embodiment also addresses storage device (e.g., SAN) degradation. For example, with multiple virtual machines and the cache system operating in write back cache mode, giving priority to the IOs from the high priority VM(s) when destaging data effectively gives the high priority virtual machines better quality of service (QOS) even in the face of a slow SAN resource.

The virtual machine prioritization approach, in one embodiment, operates as follows:

1. A priority for each virtual machine running on the computing system is set. This can be done by a user or administrator of the computing system or via some preprogrammed or automated mechanism. In one embodiment, the priority is simply a monotonically increasing number where the lower the number the higher the priority. As an example, there are 15 virtual machines that have been divided into 3 prioritization groups, Group A having a priority of 1, Group B having a priority of 2, and Group C having a priority of 3. This means that any virtual machines included in Group A have the highest priority.

2. Latency values are determined or collected for each resource (e.g., local flash, network, and SAN). Then, for each IO serviced by the cache system, irrespective of which virtual machine it is for, an X minute rolling average for the latency seen by IOs for that resource is maintained (e.g., a variable universalLocalFlashLatency for local flash, a variable universalRemoteFlashLatency for network, and a variable universalSANLatency for SAN). To be clear, this means that an X minute rolling average for latency for each of the resources is maintained or tracked.

3. Resource Algorithm for a read command. For each of the resources (again, e.g., local flash, network, SAN), in one embodiment, the process is as follows:
   a. The X minute rolling read latency average for the given resource is obtained.
   b. If the rolling read latency average is greater than a threshold read latency for that resource, then:
      i. If an amount of time since a last upgrade operation of that resource is greater than a variable resourceActivityThreshold, then the process continues with the following step 3(b)(ii), else the process returns to step 3(a) above.
      ii. The lowest priority group that has virtual machines using this resource is identified.
      iii. For all virtual machines in the lowest priority group:
         1. The virtual machine that is consuming this resource the most is identified. In an embodiment, a metric for consumption is configurable (e.g., based on number of IOs or data throughput).
         2. The above described approach(es) is/are then used to downgrade that identified virtual machine for that resource.
         3. A variable resourceDowngradeLatencyTimeStamp is then set to the current time.
   c. If the rolling read latency average is less than a threshold READ latency for that resource, then the process continues with step 3(c)(i), else the process returns to step 3(a) above:
      i. All downgraded virtual machines are identified.
      ii. Then, for each identified downgraded virtual machine:
         1. The virtual machine that is consuming this resource the least is identified.
         2. The approach described above is then used to upgrade that identified virtual machine for that resource.
         3. A variable resourceUpgradeLatencyTimeStamp is then set to the current time.

4. Resource Algorithm for a write command. For each of the resources (again, e.g., local flash, network, SAN), in one embodiment, the process is as follows:
   a. The X minute rolling write latency average for the given resource is obtained.
   b. If the rolling write latency average is greater than a threshold write latency for that resource, then:
      i. If an amount of time since a last upgrade operation of that resource is greater than the variable resourceActivityThreshold, then the process continues at step 4(b)(ii), else the process returns to step 4(a) above.
      ii. The lowest priority group that has virtual machines using this resource is identified.
      iii. For all virtual machines in the lowest priority group:
         1. The virtual machine that is consuming this resource the most is identified.
         2. The approach described above is then used to downgrade that identified virtual machine for that resource.
         3. The variable resourceDowngradeLatencyTimeStamp is then set to the current time.
   c. If the rolling write latency average is less than a threshold write latency for that resource, then the process continues with step 4(c)(i), else the process returns to step 4(a) above:
      i. All downgraded virtual machines are identified.
      ii. Then, for each identified downgraded virtual machine:
         1. The virtual machine that is consuming this resource the least is identified.
         2. The approach described above is then used to upgrade that identified virtual machine for that resource.
         3. The variable resourceUpgradeLatencyTimeStamp is then set to the current time.

5. Resource Algorithm for a SAN degradation. In one embodiment, the process is as follows:
   a. If SAN latency starts degrading below a variable SANThresholdLatency (a system configured or user settable value), then
      i. The virtual machines running in write back cache mode are identified.
      ii. Of those identified virtual machines, the virtual machine with the lowest priority is identified.
      iii. That identified lowest priority virtual machine has its destaging rate reduced (i.e., a rate at which IOs are written out by the destager is reduced).

Regarding the process of step 5 described above, as would be understood by one of skill in the art in light of the teachings herein, when operating in write back cache mode virtual machines are writing (via the cache system) to local flash and a destager is taking data out of the flash and writing it out to the SAN. But since SAN bandwidth is limited, all virtual machines are sharing this bandwidth. When virtual machines are sharing this bandwidth equally, all of the staging areas will get filled up at the same rate. So, if the SAN slows down, all the virtual machine's staging areas will get filled up at the same rate, so eventually all the virtual machines will hit flow control where there is no space in the flash memory and they all then have to run in a throttled mode. But with the process of step 5 above, the virtual machine with high priority is given a larger chunk of the SAN bandwidth so its staging area will remain constant or at least not grow. So, in case of SAN slowdown, the lower priority virtual machines will hit flow control first and the higher priority virtual machines will continue to use flash as their cached data in flash is being evicted at a faster rate.

In a further embodiment, the Resource Manager running on a host can also, when experiencing performance issues, reject remote requests received across the network from remote virtual machines thereby preserving local flash bandwidth. This embodiment can be viewed as having two state diagrams. One of those state diagrams would transition between one state that allows reads from remote virtual machines, in a normal operating mode or after a read upgrade, and another state that does not allow reads by a remote virtual machine, after a read downgrade. In this state diagram, write upgrades and downgrades are considered no-operations (no-ops) by remaining in a given state. The other of those state diagrams would transition between one state that allows writes from remote virtual machines, in a normal operating mode, and another state that does not allow writes by a remote virtual machine, after a write downgrade. In this state diagram, read upgrades and downgrades are considered no-ops by remaining in a given state.

Using the methods and systems described herein, cache resources are managed in various ways depending on the type of resource and whether poor performance of the cache resource is due to a latency in executing read commands or a latency in executing write commands. The cache resources can be upgraded and/or reset to their normal state when a reset event occurs.

The disclosed method and apparatus has been explained above with reference to several embodiments. Other embodiments will be apparent to those skilled in the art in light of this disclosure. Certain aspects of the described method and apparatus may readily be implemented using configurations other than those described in the embodiments above, or in conjunction with elements other than those described above. For example, different algorithms and/or logic circuits, perhaps more complex than those described herein, may be used.

Further, it should also be appreciated that the described method and apparatus can be implemented in numerous ways, including as a process, an apparatus, or a system. The methods described herein may be implemented by program instructions for instructing a processor to perform such methods, and such instructions recorded on a non-transitory computer readable storage medium such as a hard disk drive, floppy disk, optical disc such as a compact disc (CD) or digital versatile disc (DVD), flash memory, etc., or communicated over a computer network wherein the program instructions are sent over optical or electronic communication links. It should be noted that the order of the steps of the methods described herein may be altered and still be within the scope of the disclosure.

It is to be understood that the examples given are for illustrative purposes only and may be extended to other implementations and embodiments with different conventions and techniques. For example, the transitions shown in state diagrams 200, 300, 400, and 500 are not intended to be limiting and different transitions or states can be used depending on the characteristics of the environment 100. While a number of embodiments are described, there is no intent to limit the disclosure to the embodiment(s) disclosed herein. On the contrary, the intent is to cover all alternatives, modifications, and equivalents apparent to those familiar with the art.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A method comprising:
   determining, by a resource manager, whether previously issued read commands from a cache system across a network to a remote flash memory incurred network latency problems;
   determining, by the resource manager, whether previously issued read commands from the cache system to a local flash memory incurred local flash memory latency problems;
   determining, by the resource manager, whether previously issued false write commands from the cache system to the local flash memory incurred local flash memory write latency problems;
   determining, by the resource manager, whether previously issued true write commands from the cache system to the local flash memory incurred local flash memory write latency problems;
   receiving by the cache system a command from a virtual machine;
   and if the received command is a read command then, issuing the read command from the cache system across the network to the remote flash memory if the resource manager determined that previously issued read commands from the cache system across the network to the remote flash memory did not incur network latency problems, and returning a remote flash memory read command result from the cache system to the virtual machine, else issuing the read command from the cache system to the local flash memory if the resource manager determined that previously issued read commands from the cache system to the local flash memory did not incur local flash memory read latency problems, and returning a local flash memory read command result from the cache system to the virtual machine, else issuing the read command from the cache system to a storage system and issuing a false write command to the local flash memory if the resource manager determined that previously issued false write commands from the cache system to the local flash memory did not incur local flash memory write latency problems, and returning a storage system read command result from the cache system to the virtual machine, else if the received command is a true write command then, issuing the true write command from the cache system to the local flash memory if the resource manager determined that previously issued true write commands from the cache system to the local flash memory did not incur local flash write latency problems, else issuing the true write command from the cache system to the storage system, and returning a true write command result from the cache system to the virtual machine;

wherein a false write command is a write to cache memory initiated by a generated read command, and a true write command is a write to cache memory initiated in response to a generated write command.

2. The method of claim 1 wherein determining, by the resource manager, whether previously issued read commands from the cache system across the network to the remote flash memory incurred network latency problems is by the resource manager counting how many times previously issued read commands from the cache system across the network to the remote flash memory did incur network latency problems and determining that the count has exceeded a threshold.

3. The method of claim 1 wherein determining, by the resource manager, whether previously issued read commands from the cache system to the local flash memory incurred local flash memory read latency problems is by the resource manager counting how many times previously issued read commands from the cache system to the local flash memory did incur local flash memory read latency problems and determining that the count has exceeded a threshold.

4. The method of claim 1 wherein determining, by the resource manager, whether previously issued false write commands from the cache system to the local flash memory incurred local flash memory write latency problems is by the resource manager counting how many times previously issued false write commands from the cache system to the local flash memory did incur local flash memory write latency problems and determining that the count has exceeded a threshold.

5. The method of claim 1 wherein determining, by the resource manager, whether previously issued true write commands from the cache system to the local flash memory incurred local flash memory write latency problems is by the resource manager counting how many times previously issued true write commands from the cache system to the local flash memory did incur local flash memory write latency problems and determining that the count has exceeded a threshold.

6. The method of claim 1 further comprising resetting a determination that:
i) previously issued read commands from the cache system across the network to the remote flash did incur network latency problems;
ii) previously issued read commands from the cache system to the local flash did incur local flash memory read latency problems;
iii) previously issued false write commands from the cache system to the local flash memory did incur local flash memory write latency problems; or
iv) previously issued true write commands from the cache system to the local flash memory did incur local flash write latency problems.

7. The method of claim 6 wherein resetting the determination is based on an elapsed period of time, a latency of a cache resource, or a state of a cache resource.

8. A method comprising:
receiving by a cache system a command from a virtual machine;
and if the cache system is operating in a write back cache mode and the received command is a read command then, issuing the read command from the cache system across a network to a remote flash memory if previously issued read commands from the cache system across the network to the remote flash memory did not incur network latency problems, and returning a remote flash memory read command result from the cache system to the virtual machine, else transitioning the cache system to operating in a write through cache mode if previously issued read commands from the cache system to a local flash memory did incur local flash memory read latency problems, else issuing the read command from the cache system to the local flash memory if previously issued read commands from the cache system to the local flash memory did not incur local flash memory read latency problems, and returning a local flash memory read command result from the cache system to the virtual machine, else issuing the read command from the cache system to a storage system and issuing a false write command to the local flash memory if previously issued false write commands from the cache system to the local flash memory did not incur local flash memory write latency problems, and returning a storage system read command result from the cache system to the virtual machine, else if the cache system is operating in a write back cache mode and the received command is a true write command then, transitioning the cache system to operating in a write through cache mode if previously issued write commands from the cache system to the local flash memory did incur local flash memory write latency problems, else issuing the true write command from the cache system to the local flash memory, and returning a true write command result from the cache system to the virtual machine, and transitioning the cache system to operating in a write through cache mode if previously issued write commands from the cache system to the remote flash memory did incur remote flash memory write latency problems, else issuing the true write command from the cache system to the remote flash memory, and returning a true write command result from the cache system to the virtual machine;
wherein a false write command is a write to cache memory initiated by a generated read command, and a true write command is a write to cache memory initiated in response to a generated write command.

9. The method of claim 8 further comprising determining, by a resource manager, that the previously issued read commands from the cache system across the network to the remote flash memory did not incur network latency problems by counting how many times previously issued read commands from the cache system across the network to the remote flash memory did incur network latency problems and determining that the count has not exceeded a threshold.

10. The method of claim 8 further comprising determining, by a resource manager, that the previously issued read commands from the cache system to the local flash memory did not incur local flash memory read latency problems by counting how many times previously issued read commands from the cache system to the local flash memory did incur local flash memory read latency problems and determining that the count has not exceeded a threshold.

11. The method of claim 8 further comprising determining, by a resource manager, that the previously issued false write commands from the cache system to the local flash memory did not incur local flash memory write latency problems by counting how many times previously issued false write commands from the cache system to the local flash memory did incur local flash memory write latency problems and determining that the count has not exceeded a threshold.

12. The method of claim 8 further comprising determining, by a resource manager, that the previously issued true write commands from the cache system to the local flash memory did not incur local flash memory write latency problems by counting how many times previously issued true write commands from the cache system to the local flash memory did incur local flash memory write latency problems and determining that the count has not exceeded a threshold.

13. The method of claim 8 further comprising resetting a determination that:
  i) previously issued read commands form the cache system across the network to the remote flash did incur network latency problems;
  ii) previously issued read commands from the cache system to the local flash did incur local flash memory read latency problems;
  iii) previously issued false write commands from the cache system to the local flash memory did incur local flash memory write latency problems; or
  iv) previously issued true write commands from the cache system to the local flash memory did incur local flash write latency problems.

14. The method of claim 13 wherein resetting the determination is based on an elapsed period of time, a latency of a cache resource, or a state of a cache resource.

* * * * *